June 7, 1932.  J. J. KRALY ET AL  1,862,408
NONSKID UNIT
Filed Jan. 29, 1930  3 Sheets-Sheet 1
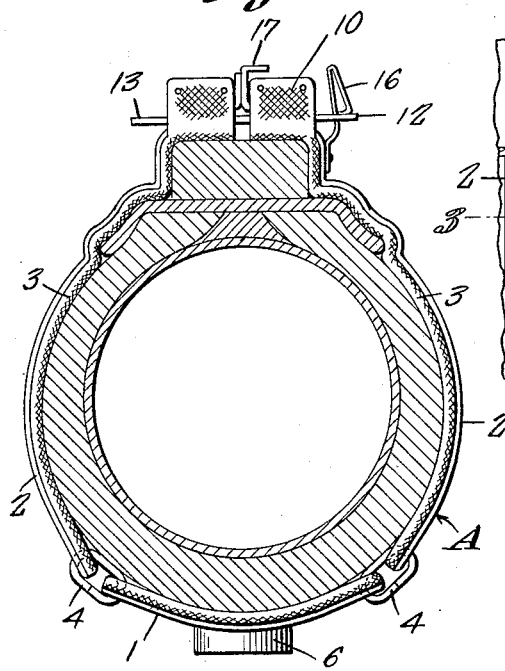
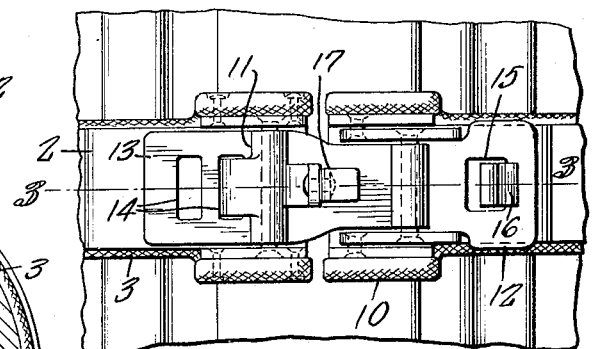
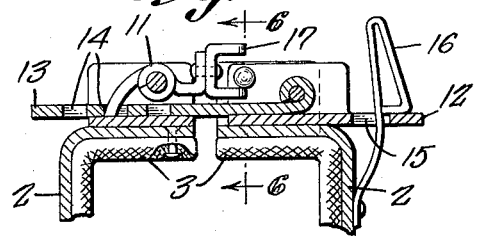
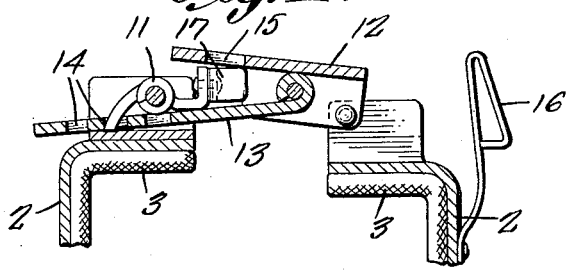
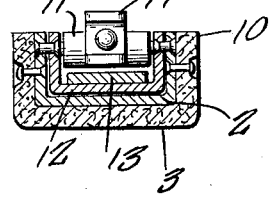
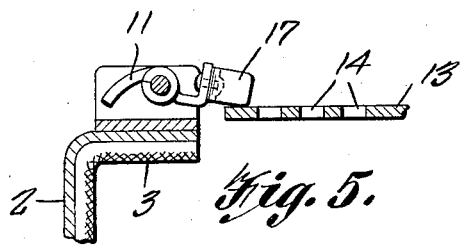
Joseph J. Kraly,
Charles Kraly,
INVENTORS
BY Victor J. Evans
ATTORNEY

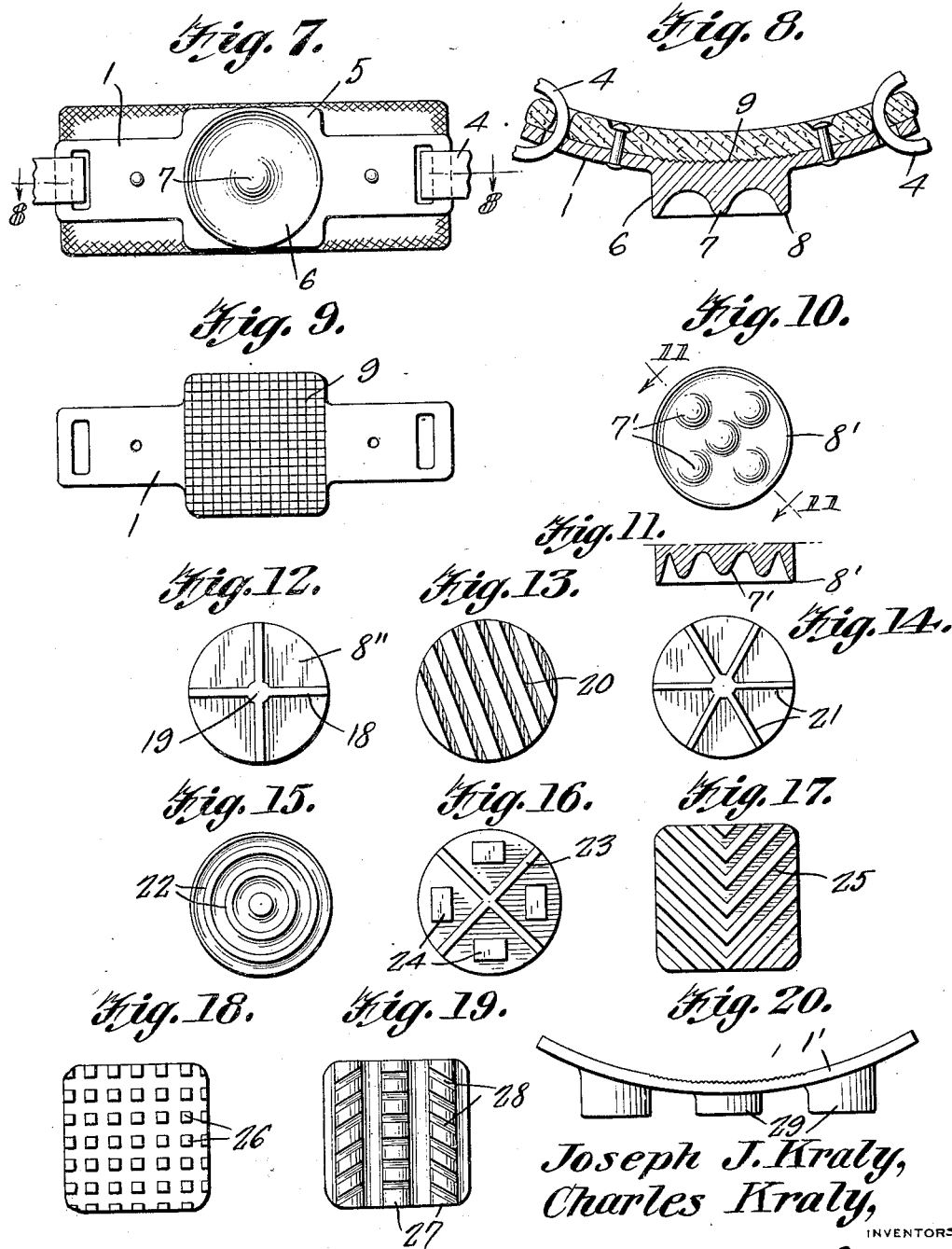

Patented June 7, 1932

1,862,408

UNITED STATES PATENT OFFICE

JOSEPH J. KRALY AND CHARLES KRALY, OF PITTSBURGH, PENNSYLVANIA

NONSKID UNIT

Application filed January 29, 1930. Serial No. 424,389.

This invention relates to a non-skid unit for the wheels of vehicles, the general object of the invention being to provide means for preventing skidding and slipping of a vehicle, with means whereby the device can be easily and quickly attached to a wheel and removed therefrom, with means forming part of the device for engaging a road surface in such a manner as to positively prevent skidding and slipping of a wheel.

A further object of the invention is to make the device in separate units so that one or more of the devices can be attached to a spoked wheel or the devices can be attached to side chains and used on disk wheels and other wheels.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a transverse sectional view through portion of a wheel, showing the device applied thereto.

Figure 2 is a plan view showing the means for fastening the device to the wheel.

Figure 3 is a section on line 3—3 of Figure 2.

Figure 4 is a view similar to Figure 3, but showing the parts in partly unfastened position.

Figure 5 is a detail sectional view showing the parts unfastened.

Figure 6 is a section on line 6—6 of Figure 3.

Figure 7 is a plan view of the central section of the member.

Figure 8 is a section on line 8—8 of Figure 7.

Figure 9 is a view of the inner face of the central section, with the lining removed.

Figure 10 is a view showing a modified form of gripping member.

Figure 11 is a section on line 11—11 of Figure 10.

Figures 12 to 19 show views of different forms of gripping members.

Figure 20 is an edge view showing the central member formed with three gripping members.

Figure 21:
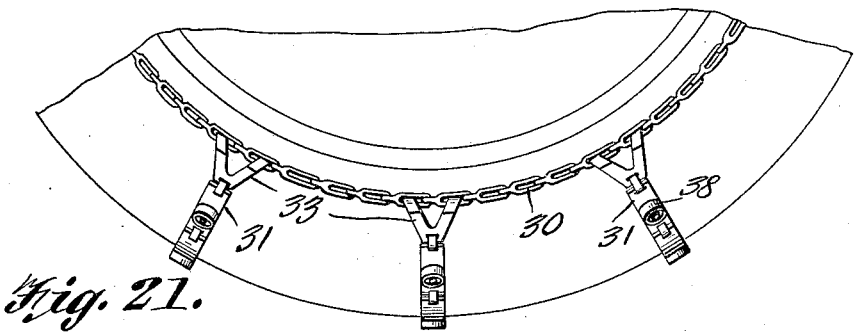
Figure 21 is a view showing several units attached to side chains on a disk wheel.

In these drawings, the unit A is composed of the middle section 1 and the side sections 2, each section being provided with a lining 3 of suitable material, such as canvas or the like, and the sections being connected together by the links 4 which pass through holes in the sections. The middle section has its center enlarged, as shown at 5, and a circular gripping member 6 is connected with the enlargement, this circular member having a concaved outer face with a central projection 7 therein so that a beveled edge 8 is formed to grip the road surface. The inner face of the enlargement is roughened, as shown at 9, so that this face can engage the lining without slipping.

The device is shaped to fit snugly the tire, the rim and the felly of the wheel, as shown in Figure 1, and the free end of each side section 2 is of channel shaped construction, as shown at 10, with the lining extending over the outer faces of the flanges and fastened thereto. A latch 11 is pivoted in one channel-shaped part and a channel-shaped lever 12 is eccentrically pivoted in the other channel-shaped part. A second lever 13 is pivoted intermediate the ends of the lever 12 and has slots 14 therein so that when said lever 13 is passed through the channel-shaped part which carries the latch 11, said latch will engage any desired slot 14. The free end of the lever 12 is flattened and has a slot 15 therein which, when the lever 12 is moved into operative position, will receive a spring latch 16 fastened to the device and thus the lever 12 will be held in locking position.

As will be seen, by making the pivot of the lever 12 eccentric and by pivoting the lever 13 intermediate the ends of the lever 12, when the lever 12 is swung into locking position with the latch 11 engaging a slot 14 in the lever 13, the free ends of the sections 2 will be drawn toward each other and thus the device will be caused to clamp the tire and felly and rim and by providing a plurality of the slots 14, the device is adjustable so that it can be used on tires of different sizes. The latch 16 will hold the lever 12 in locking position and in order to prevent the latch 11 from moving to unlocking position, we pivot a channel-shaped member 17 on the handle of the latch which, when turned to place one of its flanges against the lever 13, will hold the latch 11 against movement and in engagement with a slot 14. Thus when the device is to be placed on a wheel, the lever 12 is swung to the position it occupies in Figure 4 so that the lever 13 can be passed under the latch 11 to cause said latch to engage the desired slot 14 in the lever 13 and then the lever 12 is swung over so that it will draw the parts together and by passing the latch 16 through the slots 15, the lever 12 will be held in locking position. Then the member 17 is turned to lock the latch 11 in locking position, as shown in Figure 3.

Figures 10 and 11 show the gripping member 8' formed with a number of recesses 7' to form the gripping face on said member and Figure 12 shows the gripping member 8'' formed with the ribs 18 which extend at right angles from each other and with a central projection 19.

Figure 13 shows the gripping member formed with a plurality of spaced diagonal grooves 20, while Figure 14 shows the gripping member somewhat similar to Figure 12, but provided with radiating ribs 21.

Figure 15 shows a gripping member formed with annular ribs 22 and Figure 16 shows a gripping member formed with ribs 23 in the form of an X and projections 24 placed between the diverging portions of the projections.

Figure 17 shows a gripping member provided with V-shaped grooves 25, while Figure 18 shows a gripping member provided with a plurality of small projections 26 arranged in vertical and horizontal rows.

Figure 19 shows a gripping member formed with ribs 27 which are grooved, as shown at 28.

Figure 20 shows the central section 1' formed with three gripping members 29, the gripping faces of these members being roughened in any desired manner by grooves or the like.

Figure 22:
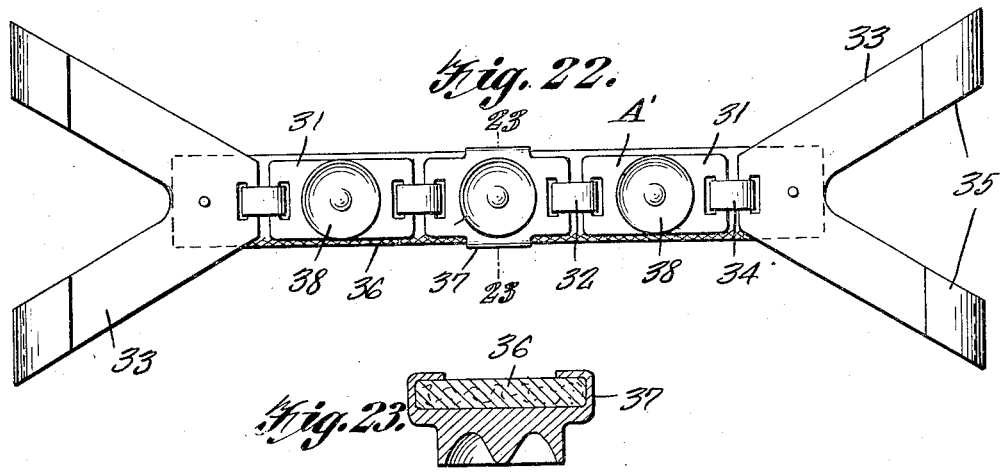
Figure 22 is a plan view of one of these units.
Figure 23:
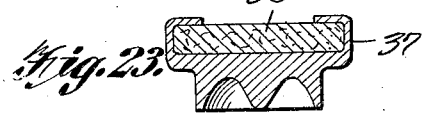
Figure 23 is a section on line 23—23 of Figure 22.

Figures 21, 22 and 23 show a unit A' for use with side chains 30. Each unit is composed of a number of blocks 31 connected together by links 32, with the outer links connected to V-shaped members 33 by links 34, the extremities of the limbs of the members 33 having hooks 35 thereon for engaging certain links of the side chains. A lining 36 of suitable material extends under the plates and links and has its ends fastened to the apexes of the members 33. Ears 37 are formed on the edges of the central plate 31 and are bent over the lining, as shown in Figure 23, and each plate is provided with a gripping member 38. By making the end members 33 of V shape, one hook of each member can engage one link of a side chain and the other hook another link, as shown in Figure 21, so that if one limb should become detached from the side chain, the device would still be held in place by the other link.

Figure 24:
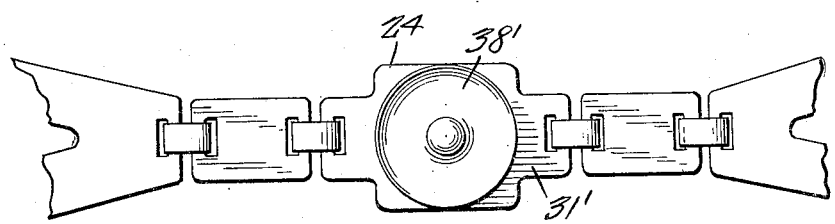
Figure 24 is a view showing a modified form of a unit used with side chains.

Figure 24 shows a modification of a unit used with side chains in which only the central plate 31' carries the gripping member 38', the other plates being radius and plain.

From the foregoing it will be seen that we have provided a non-skid unit which can be easily and quickly attached to a wheel and that either a single unit or any desired number can be used. In the first form of the invention, if the lever 12 should become detached from the latch 16, the device would still be held on the wheel by the member 17 holding the latch 11 in latching position so that there would be no danger of losing the device. This form of the invention is firmly held on the wheel without being engaged with a spoke as the locking means and the lining and the snug fit of the device with the tire, felly and rim act to firmly hold the device in position without danger of slipping. Each gripping member will first contact the road surface at one edge thereof so that the gripping member will bite into the surface and then as the gripping member starts to leave the surface, the opposite edge will bite into the surface and the grooves and projections formed on the various gripping members shown will act to cause the member to secure a firm grip on the surface so that there is no danger of the parts slipping and these members will not only prevent the wheel from spinning, but will also prevent it from slipping sidewise. Either a section formed with but one gripping member may be used, as shown in Figure 1, or a section with a number of gripping members may be used, as shown in Figures 20 and 22, and the units for use with the side chains can also be provided with a number of gripping members, as shown in Figures 20 and 22, or with but a single member, as shown in Figure 24.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

A non-skid unit comprising an odd number of flat members, links connecting the same, a lining strip extending across the inner faces of the members and links, cleats formed only on the member at the median of the series of said members and securing the lining therewith, and outer substantially V-shaped flat chain attaching devices at their smaller ends connected with the outermost members and overlying the ends of said lining and adapted at their opposite ends for two-point connection with side chains.

In testimony whereof we affix our signatures.

JOSEPH J. KRALY.
CHARLES KRALY.